US012044441B2

(12) United States Patent
Miles

(10) Patent No.: US 12,044,441 B2
(45) Date of Patent: Jul. 23, 2024

(54) SYSTEMS FOR SOLAR THERMAL HEAT TRANSFER

(71) Applicant: Mark W Miles, Oakland, CA (US)

(72) Inventor: Mark W Miles, Oakland, CA (US)

( * ) Notice: Subject to any disclaimer, the term of this patent is extended or adjusted under 35 U.S.C. 154(b) by 0 days.

(21) Appl. No.: 16/151,842

(22) Filed: Oct. 4, 2018

(65) Prior Publication Data
US 2019/0101310 A1  Apr. 4, 2019

Related U.S. Application Data

(60) Provisional application No. 62/568,187, filed on Oct. 4, 2017.

(51) Int. Cl.
| | |
|---|---|
| *F24S 10/00* | (2018.01) |
| *F24S 10/30* | (2018.01) |
| *F24S 10/70* | (2018.01) |
| *F24S 20/60* | (2018.01) |
| *F24S 40/53* | (2018.01) |
| *F24S 40/60* | (2018.01) |
| *F24S 50/40* | (2018.01) |
| *F24S 80/30* | (2018.01) |
| *F24S 80/65* | (2018.01) |
| *F24S 90/00* | (2018.01) |
| *F24S 80/00* | (2018.01) |

(52) U.S. Cl.
CPC .............. *F24S 10/73* (2018.05); *F24S 10/30* (2018.05); *F24S 10/70* (2018.05); *F24S 20/60* (2018.05); *F24S 40/53* (2018.05); *F24S 40/60* (2018.05); *F24S 50/40* (2018.05); *F24S 80/30* (2018.05); *F24S 80/65* (2018.05); *F24S 90/00* (2018.05); *F24S 2010/71* (2018.05); *F24S 2080/015* (2018.05)

(58) Field of Classification Search
CPC ....................................................... F24S 10/73
USPC .................................................. 126/647, 643
See application file for complete search history.

(56) References Cited

U.S. PATENT DOCUMENTS

| | | | | |
|---|---|---|---|---|
| 4,090,494 A | * | 5/1978 | Borst ...................... | F24S 70/65 |
| | | | | 126/609 |
| 4,154,220 A | * | 5/1979 | Loth ....................... | F24S 70/60 |
| | | | | 126/687 |
| 4,206,748 A | * | 6/1980 | Goodman ............... | F24S 20/62 |
| | | | | 126/668 |
| 4,222,373 A | * | 9/1980 | Davis ..................... | F24S 70/16 |
| | | | | 126/664 |
| 4,281,642 A | * | 8/1981 | Steinberg ............... | F24S 23/70 |
| | | | | 126/661 |
| 4,300,539 A | * | 11/1981 | Dobson .................. | B28B 1/522 |
| | | | | 126/664 |
| 4,370,974 A | * | 2/1983 | Maxey .................... | F24S 23/70 |
| | | | | 136/246 |
| 2002/0050343 A1 | * | 5/2002 | Kawamoto ............. | C23C 30/00 |
| | | | | 165/133 |
| 2011/0011087 A1 | * | 1/2011 | Sorensen ............... | F24S 80/525 |
| | | | | 126/584 |
| 2012/0060500 A1 | * | 3/2012 | Nicolaescu ............ | F24S 80/54 |
| | | | | 126/642 |

(Continued)

*Primary Examiner* — Avinash A Savani
(74) *Attorney, Agent, or Firm* — Vani Moodley, Esq.

(57) ABSTRACT

A solar thermal system is provided. The system comprises at least one solar thermal collector for heating a heat transfer fluid (HTF); and at least one conduit for transporting the HTF into and out of the at least one solar thermal collector; wherein said at least one conduit is of a foam or plastics material.

13 Claims, 7 Drawing Sheets

(56) References Cited

U.S. PATENT DOCUMENTS

2012/0096781 A1* 4/2012 Romesburg ............. E04D 3/358
　　　　　　　　　　　　　　　　　　　　　　52/173.3

* cited by examiner

SYSTEMS FOR SOLAR THERMAL HEAT TRANSFER

FIELD

Embodiments of the invention relate to devices and methods to transport solar thermal heat to a point of use.

BACKGROUND

Solar thermal heat is heat that is created by the absorption of sunlight by a device known as a solar thermal collector. In order for the resulting heat to be utilized it usually has to be transported from the collector to a point of use. For collectors which rely on a liquid heat transfer fluid (HTF), the fluid is conveyed to a point of use via a system and network of pipes which are compatible with the fluid and its thermophysical properties. The fluid is often water or a water glycol solution. If the HTF is water the system must compensate for the fact that under certain conditions that the water will freeze. In both cases the system must account for the fact that water may boil under certain conditions. This adds cost and complexity to the system and pipe network.

SUMMARY

According to one aspect of the invention, there is provided a system for transporting solar thermal heat comprising:
 a once through HTF network that is constantly supplied by ambient air, and a closed loop network that only minimally exchanges air with the ambient;

According to another aspect of the invention, there is provided a system for transporting solar thermal heat comprising:
 a network that combines one or more parallel HTF segment loops, connecting individual collectors and collectors connected in series;

According to another aspect of the invention, there is provided a system for transporting solar thermal heat comprising:
 conduits that are circular, rectangular, or triangular in shape;

According to another aspect of the invention, there is provided a system for transporting solar thermal heat comprising:
 a press fit or friction fit or other means for connecting the collector to the conduit, and for connecting sections of conduit to other conduit sections in an airtight way;

According to another aspect of the invention, there is provided a system for transporting solar thermal heat comprising:
 a means to control HTF pressure by fixed aperture or porosity flow restrictors integrated with each collector and/or changes in conduit diameter;

According to another aspect of the invention, there is provided a system for transporting solar thermal heat comprising:
 a means to prevent thermal stagnation within the individual collectors by passive ventilation or active valves;

According to another aspect of the invention, there is provided a system for transporting solar thermal heat comprising:
 a means to insure the purging of any liquid heat transfer fluids in the event the system pumps and fans are not in a powered state;

According to another aspect of the invention, there is provided a system for transporting solar thermal heat comprising:
 a physical layout that combines one or more segment loops with a single extraction loop;

According to another aspect of the invention, there is provided a system for transporting solar thermal heat comprising:
 conduits that utilize the body of the collector as one insulating surface;

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that, the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not others.

In general, any system for transporting solar thermal heat must rely on a heat transfer fluid (HTF) to move that heat from the solar thermal collector to the point of use. In the case where the collector itself utilizes air internally as an HTF, as opposed to a fluid, the system must take into account the larger volume of air required to transport the same amount of heat. Pipes are generally used to transport fluids and for residential scale systems a pipe diameter of ½" to 1" is generally sufficient to handle the mass flow needs. For an equivalently scaled system relying on air the pipe must have a diameter of 4"-6" or more depending on the total flow rate. Pipes of this diameter that used to transport a gas will be referred to as conduits and this will be the term used throughout this specification. All air flow between different components discussed in the specification will be directed by conduits which are insulating and airtight.

Figure 1:
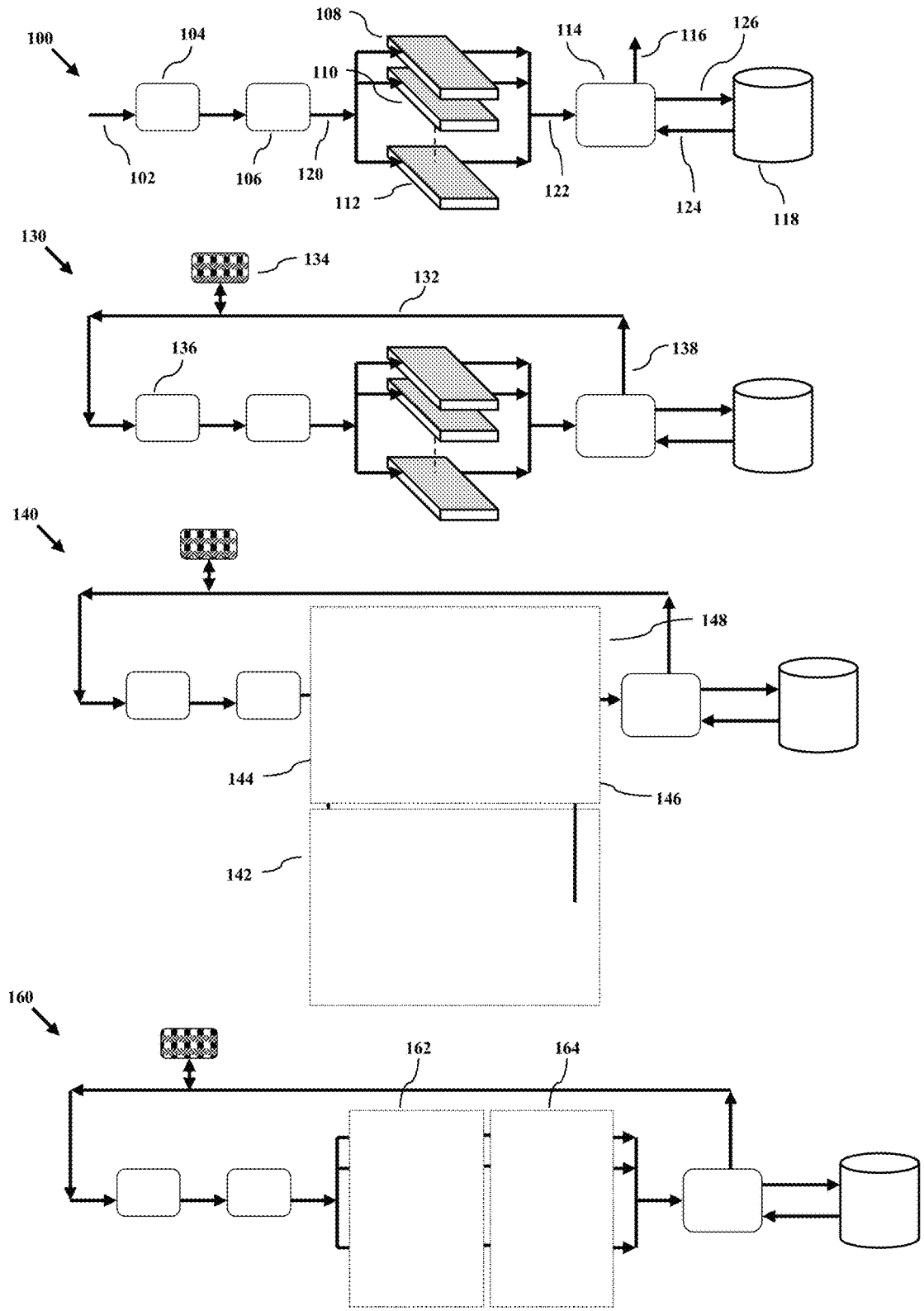
FIG. 1 is a schematic drawing showing various configurations of a system for solar thermal heat transfer.

Referring to FIG. 1, four configurations for a conduit system for solar thermal heat transfer are shown in schematic form. Configuration 100 is a "once-through" configuration in that the air utilized to transport heat originates from outside the conduit system and is only used once. Inlet air 102 is extracted from the environment through filter unit 104 via fan unit 106. Filter unit 104 is similar in construction and function to the air filter found in many HVAC or automobile systems where the goal is to prevent the incursion of particulates and dust normally found in ambient air. Fan unit 106 provides the motive pressure for the air throughout the system. Air from fan unit 106 is distributed in a parallel fashion to collectors 108, 110 which represent collectors 1 and 2, and collector 112, which represents collector number n on a segment loop that comprises n collectors. A segment loop is a set of n collectors which are supplied with air by a single inlet segment conduit 120 and connected by a single outlet segment conduit 122 to the rest of the system. Air emerging from out let conduit 122 flows to heat exchanger 114 where it ultimately exhausted to the atmosphere via output port 116.

During normal operation air which passes through collectors 108, 110, and 112 is heated by the sun and flows through outlet segment conduit 112 at a higher temperature. The function of heat exchanger 114 is to transfer the heat contained within this air to a point of use fluid via fluid loop 124, 126 to a thermal storage tank 118.

Configuration 130 is a closed loop system in that most of the air utilized for transporting heat is isolated from air in the atmosphere. This configuration is differentiated by the presence of an air return link 132 which takes air normally emitted by exhaust port 138 and returns for re-use to filter unit 136. The entire system is nominally hermetically sealed in that there are airtight connections between all conduits and components. Air does however expand and contract based on its temperature which is a characteristic that must be compensated for. This is accomplished via breather unit 134 which allows for free flow of air between the interior of the system and the atmosphere. On a basic level breather unit 134 comprises a low threshold valve which allows flow to and from the interior of the system with minimal pressure differentials and a filter like the one incorporated into filter unit 136 to provide the same functionality, which is to to prevent the incursion of particulates and other airborne contaminants from entering the loop. In this configuration filter unit 136 primarily functions to capture any particulates or other debris that might be generated from within the heat transfer system over time.

Configuration 140 is identical to configuration 130 except that it adds a second set of collectors 142 that consist of a second segment loop that is connected via extractor loop inlet leg 144 and extractor loop outlet leg 146. Extractor loop inlet leg 144, and output leg 146 may provide and extract, respectively, equivalent volumes of air to both collector sets 142 and 148, or may provide different volumes based on the number of collectors in each set or other factors driven by the desired performance of the collectors. This configuration serves to demonstrate how multiple sets of collectors connected in parallel, on a segment loop, can be integrated into the larger system.

Configuration 160 is novel in that it illustrates how collectors can be connected in parallel. This approach can be useful in certain circumstances where the goal is to achieve even higher temperatures than a single collector can achieve. In this case the individual collectors in collector array 162 are connected in a way that allows the pre-heated air each collector produces to be supplied to the corresponding collectors in collector array 164. This allows the collectors in array 164 to raise the temperature of the outgoing air even further which may be advantageous for certain applications.

There are several important characteristics which define the conduits that comprise a system for solar thermal heat transfer. In order to reduce heat losses to the environment the material or combination of materials from which the conduit is made must have low thermal conductivity, preferably less than 0.1 W/(mK). It must be resistant to exposure to the environment and be able to maintain function for twenty years or more. It must also be lightweight with a weight of less than 5 kg per 2.5 meter length of conduit. It must also be chemically, physically, or otherwise compatible with the air which it is transporting and the temperatures that can be achieved within the air which may be as high as 150° C. or higher. The conduit material must also be low in cost. One set of candidates for materials include but are not limited to foams or plastic media comprising or based on polyurethane, polyisocyanurate, phenolic, polyesters, polyphenols, and polyepoxide chemistries. Most of these foams incorporate the characteristics defined above. They are also relatively easy to manufacture in a variety of shapes using a process known as reaction injection molding, a process which is mature and well understood by those skilled in the art of plastic foam fabrication. Alternatively, many of these foams can be purchased as commodity products in the form of boards most often sized 2500 mm×1200 mm with thicknesses ranging from 40 mm to 100 mm though other sizes are possible. Flat board stock available for purchase can also come with a variety of facings which include thin metallic (aluminum for example) or polymer films. These films can help improve not only the foams imperviousness to water vapor or liquid incursion, but also provide a smooth finish which decreases friction as air passes through it. These as purchased facings, such as aluminum foil, that are generally compatible with the temperatures and qualities of the air that will reside within the heat transfer system. This surface of the board is designated as the interior surface as it will be facing the air flow to be directed. These as manufactured facings are not generally sufficient for exposure to outside elements for extended periods of time. Fortunately, it is possible to apply an additional coating, coatings, or a coating laminate which can make the exterior surface more robust. This laminate could comprise one or more layer of metallic films of foils, such as aluminum or stainless steel, and or acrylic, elastomeric, silicone based, aliphatic polyuria, polysparatic, or butyl rubber or other rubber like compounds and robust film materials that can withstand outdoor exposure to the elements and UV without degradation for twenty years or more. Other film materials and film laminates are possible.

In situations where interior air temperatures could exceed 150° C., it is possible to incorporate a layer of another heat resistant material with a higher operational temperature. Materials include but are not limited to calcium silicate, fiberglass, mineral wool, and vermiculite. These materials can be manufactured in planar sheets and bonded or otherwise adhered or secured to interior surface of the board stock materials mentioned above. The higher temperature material now becomes a part of the board stock facing and could have an aluminum foil film or other similar material applied to its surface which will now be in contact with the air flow. In this way higher temperature air flows can be accommodated as the interior layer of the conduit will serve as a thermal barrier and, if the thickness is properly determined, create a thermal gradient such that the lower operating temperature board stock material on the exterior is not exposed to temperatures higher than its operating range.

Figure 2:
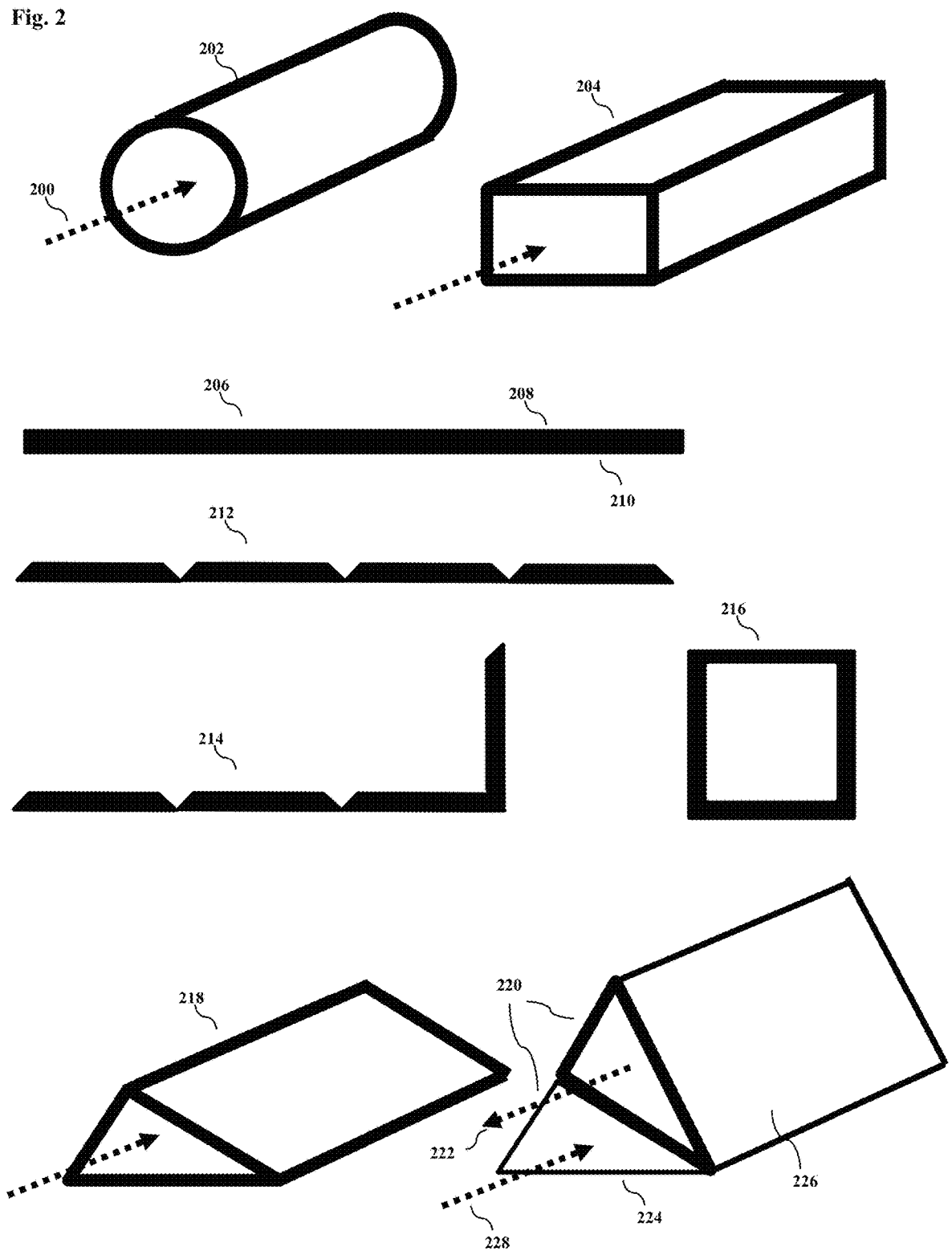
FIG. 2 is a drawing showing several geometries for conduits and conduit loops.

Referring now to FIG. 2 three forms of conduits are shown. Circular conduit 202 is shown with airflow directional indicator arrow 200. Circular conduits while optimal from a heat loss standpoint, are harder to achieve because they cannot be purchased easily in pre-existing forms and therefore must probably be manufactured using the reaction injection indicated above. Their manufacture is further complicated by the challenge of applying a facing material on the interior surface. Rectangular conduit 206 is more easily achieved and can be fabricated from flat board stock by scoring the interior surface to enable folding of the flat board. Flat board 206 is shown in its natural state with interior facing 208 and exterior laminate 210 applied. After scoring it takes on the form illustrated by 212. One fold has been accomplished illustrated by semi-folded board 214, and the fully folded board in the form of a rectangular conduit is shown as 216. The mechanical integrity of the fully folded board is maintained as the scoring does not go deep enough to damage the exterior laminate 210, and adhesives are applied to the exposed surfaces of the scores so that they adhere to the opposing scored surfaces after folding. The seam created by the final fold can be protected by a number of materials such as adhesive metal tape or by the application of another coating of exterior laminate or material like those described above.

Triangular conduit 218 is another conduit variation that can be fabricated by folding but with three scores instead of four. The dimensional proportions of the triangular conduit 218 can be controlled by changing the positions of the scores. This enables the creation of complementary ducts 224 and 226 which if proportioned appropriately can create a joined surfaces 220 which are parallel and can be advantageous under certain circumstances. Duct 226 is also shown with hot air flow 222 and a thicker wall than duct 224 which accommodates cold air flow 228. Heat loss rates to the environment are higher when the temperature differential is greater. As a result the wall thickness for duct 224 can be lower since heat losses from the cold air to the environment will be much less based on temperature difference. This is advantageous because the use of less material will result in lower costs of the system.

Figure 3:
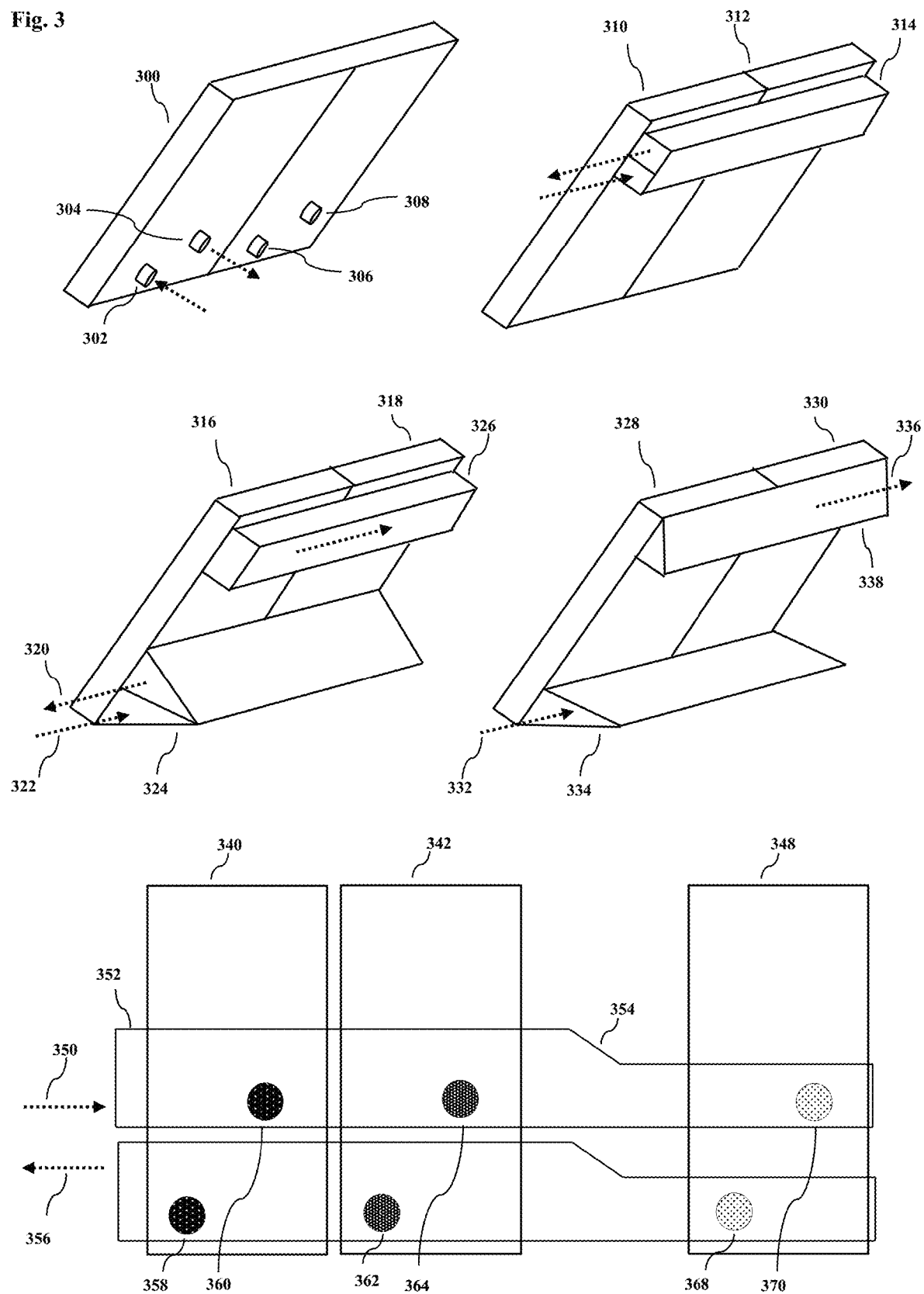
FIG. 3 is a drawing illustrating several means to integrate the conduit network with the collector as well as mechanisms to control pressure within the network.

Referring now to FIG. 3, several configurations are shown for mechanically coupling collectors to a conduit or conduit pair. Two adjacent solar thermal collectors 300, are shown with separate male inlet ports 302, 306 and male outlet ports 304, 308 mounted on the rear surface. These ports are pipe stubs made from a suitably robust plastic, plastic foam, or metal, or combination, which allow for fluid communication to the interior of the collector. In general, cold air enters the inlet port and, when the sun is shining, hot air exits the outlet port. In one preferred embodiment they are located at any point on the rear surface of the collector. Triangular conduit pair 324 is shown mounted at the bottom of collectors 316 and 318. Conduit pair 324 supports inlet flow 322, and outlet flow 320, and the faces of each conduit comprising the pair have complementary female ports, not shown, which align with the inlet and outlet ports 302,306 and 304,308, (like those of collector pair 300 but hidden from view). The complementary female ports form an airtight fit with the corresponding male inlet and outlet ports (also hidden from view) which are located on the rear of collectors 316 and 318 in the same way location as illustrated on collector pair 300. It can be seen that conduit pair 324 can serve as a mechanical base and support as the joining faces are parallel, as illustrated in FIG. 2, and that by adjusting the dimensional proportions of the conduct pair 324 the angle at which the collectors reside can be set according to the optimal angle required for collecting sunlight. Serving as a mechanical base in this design means that the conduit pair bears some portion of the weight of the collector and/or provides a degree of structural support to mechanically secure the collector to the roof or the roof mounting system. An alternative configuration is shown where rectangular conduit pair 314 is mounted higher on the rear surface of collectors 310 and 312. In this case the male inlet and outlet ports of the collectors are located higher up to accommodate the complementary female ports on conduit pair 314.

There are no restrictions on where the conduit pairs can be located though it is worth stating that in one embodiment of a system configuration there is only one pair of conduits mounted to accommodate the flow. The individual conduits do not have to be located adjacent to each other, and they may also have a different geometry. For example, a rectangular inlet conduit could be combined with a triangular outlet conduit to form a pair. The location and type conduit used will be dependent on the internal air flow configuration of the collector, the kind of mounting system used to secure the collector to the roof among other factors.

An alternative system configuration was discussed in FIG. 1, which described how two or more collectors can be connected in series in order to attain higher temperatures. To realize this configuration collector 316 would have an input port located at the bottom rear surface and an output port located at the top rear surface. Collector 318 would have an input port located at the top rear surface and an output port located on the bottom rear surface. Conduit pair 326 is instead a single conduit and only serves to provide an airflow path between series strings of one or more collectors. In a configuration involving only two collectors in a string, inlet air 322 enters collector 316 via the inlet conduit of conduit pair 324 and an input port on the collector (not shown) where it is subsequently heated within the collector. The hot air emerges from collector 316 through an output port (not shown) and is transported via conduit 326 to collector 318 where the air's temperature is raised again. It finally emerges from the output port (not shown) located on the lower rear surface of collector 318 and is conveyed by the outlet conduit of conduit pair 324 as outlet 320.

Referring again to FIG. 3, collector pair 328 and 330 are shown with a single inlet conduit 334 coupled to the bottom and a single outlet conduit 338 coupled to the top. Such a configuration could be advantageous in that the natural buoyancy effects which occur in the collectors could be used to drive flow. That is to say that cold air 332 entering the bottom of the collector via conduit 334 when heated will have a tendency to rise to the top and therefore be driven into the outlet conduit 338 and emerge as hot air flow 336. This flow may be sufficient such that no fan is required to drive the air through the system or it may require a lower amount of supplemental fan power as a consequence.

Referring again to FIG. 3, collectors 340, 342, and 348, correspond to collectors numbered 1, 2, and n on a segment loop containing n collectors. Outlet/inlet port pairs 358/360, 362/364, and 368/370 are mounted on collectors 340, 342, and 348 respectively. Inlet air 350 enters segment loop 352 by virtue of a fan (not shown) which creates pressure to drive the flow. As the flow passes inlet ports 360 and 364, the pressure of the flow is gradually reduced until it reaches inlet port 370 where the pressure reaches its lowest point. All things being equal the different pressures located at each inlet port will drive air flow into each collector at a different mass flow rate which will have an impact on the performance of each collector. For a given intensity of sunlight, the temperature of the air that emerges from a particular collector is determined by mass flow rate of air through the collector. If a uniform collector performance as measured by output temperature is to be maintained across a segment or an entire array, a means to maintain relatively uniform pressure, and thus a uniform mass flow rate, across the inlet and outlet conduits must be incorporated. One mechanism includes reducing the crossectional area of the conduit as the flow gets further away from the source. For example, at conduit cross-section reducing flange 354 which shows how the geometry of the conduit can be changed in order to achieve this result. In this way the loss of mass flow to each of the collectors is compensated by the reduction in volume within the conduit which must be filled. Another way involves the incorporation of a static flow control mechanism at the inlet or outlet port of each of the collectors. This may be in the form of an aperture with a porous screen, an iris-like diaphragm, or other flow restricting mechanism to realize the constrained geometry of a flow restrictor. If the mechanism is in the form of a porous screen then the restrictor closest to the flow input, in the case the restrictor is on the inlet ports, would have the lowest porosity providing the most restriction to flow. This would effectively lower the flow rate into the corresponding collector 340 at the point where the inlet pressure is highest. In this case the restrictor on inlet port 360. The flow restrictor located furthest away from the flow, located in inlet port 370, would have the highest porosity and therefor the least restriction to flow. This would allow an increase in the flow rate at the point where the pressure is lowest. Some combination of one or more conduit cross-section reducing flanges or of flow restrictors or both could be used to help achieve a more uniform pressure across a collector segment and therefore more uniform performance from the collector.

Figure 4:
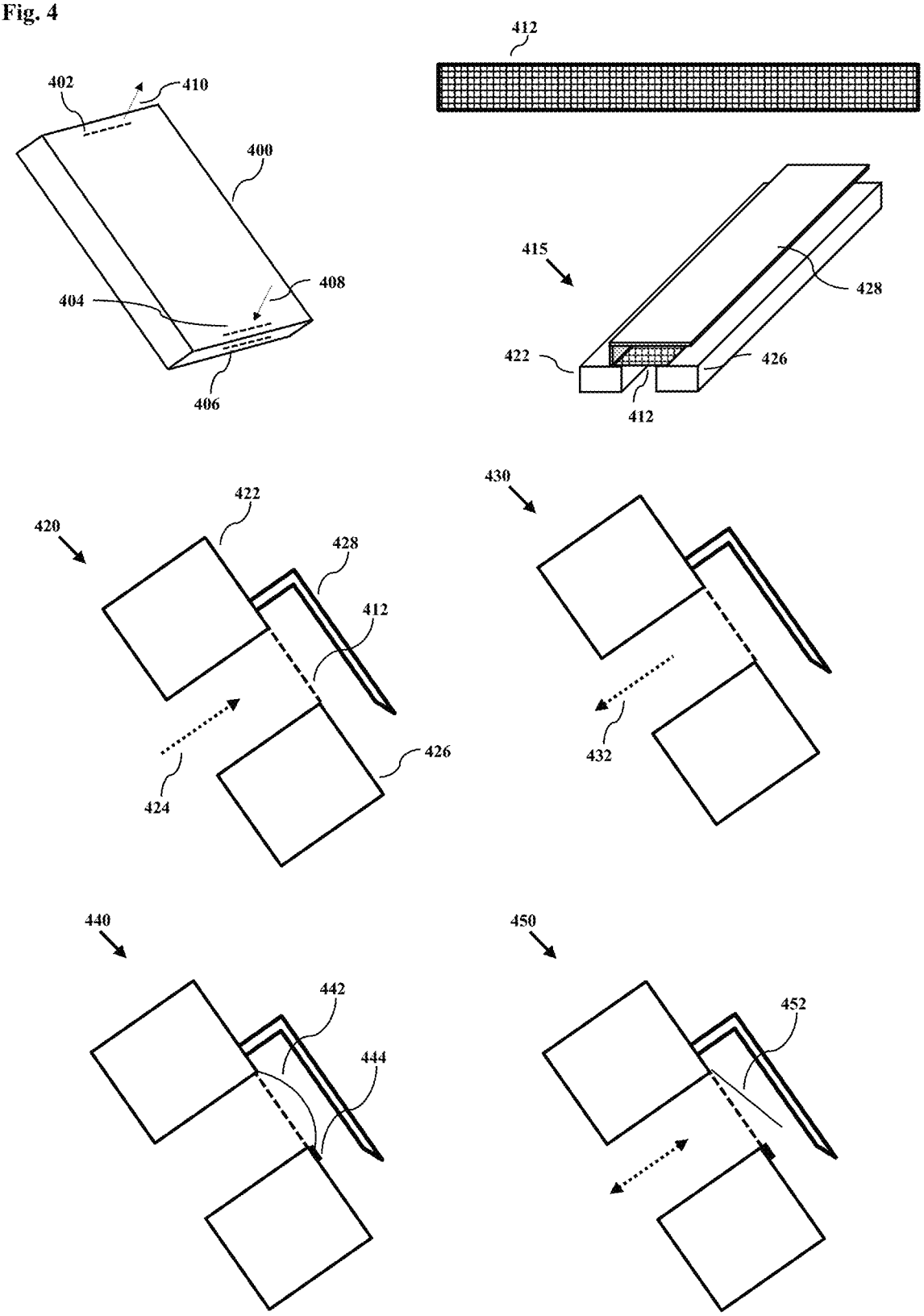
FIG. 4 is a drawing showing two mechanisms for preventing stagnation within solar thermal collectors.

In one embodiment, a system of collectors to produce heat for an application would comprise one or more segments configured and arranged to collect sunlight and heat in a uniform fashion as illustrated in FIG. 3. During normal operation when there is sufficient sunlight a fan or fans (not shown) are used to produce the pressure in the conduit loops to drive the air flow. If for some reason the fan were to stop working while the collectors are illuminated then a condition known as stagnation may ensue. In this case temperatures may rise within the collector far above normal operating conditions because there is no airflow to extract the heat which accumulates. These extreme temperatures may damage the collector. Thus, it is important to incorporate some means for dissipating heat from the collector during a stagnation event. One general way to do this is to provide a convective flow path for air from the exterior of the collector to pass through without the force driven flow created by the fan. Referring to FIG. 4, collector 400 is shown with outlet stagnation port 402 located on the top front surface, i.e. the surface facing the sun, of the collector and inlet stagnation port 404 located on the bottom top surface or alternatively inlet stagnation port 406 located on the bottom base surface of the collector. The ports are designed so that if there is no forced flow within the collector and it enters into a stagnation event, then convective flow occurs which is driven by cool exterior air 408 entering the inlet stagnation ports 404 or 406, passing through the interior of the collector and exiting through outlet stagnation port 402 as heated air 410. The ports must be of sufficient size so that the resulting convective flow can keep the collector under the desired temperature during a stagnation event. Outlet stagnation port 402 is shown in perspective and one of its key components is stagnation port screen 412, which in this case is shown in top view. Port screen 412 is made from a metal or a fiber array which is capable of withstanding temperatures as high as 300° C. or perhaps more. The material is also capable of withstanding exposure to ambient environmental conditions for twenty years or more without degradation. It is capable of allowing air to pass through but is sized to prevent or reduce the incursion of airborne particulates as well as insects or other living creatures. It's X dimensions, left to right on the page, and Y dimensions, up to down on the page, as well as its porosity, subject to the incursion prevention needs stated above, are chosen to achieve the requisite amount of flow to keep temperatures low during stagnation.

Referring again to FIG. 4, passive outlet stagnation port 415 is shown in a perspective view, and is shown in more detail and in a side view at a tilt angle which corresponds to the angle of inclination of collector 400, as port 420. Flanges 422 and 426 are the means by which the valve is mechanically and hermetically mounted to the body of the collector either via the glazing of the collector, a frame that holds a light transmitting film or surface, or in the body of the collector. Port 415/420 is mounted in such a way provide a fluid connection to the interior air flow paths of the collector. Port screen 412 is shown secured to flanges 422 and 426 and provides a means for airflow to into or out of the interior of the collector with any potential input airflow indicated by arrow 424.

It would be located on the collector as indicated by outlet stagnation port 402 on collector 400. Port gutter 428 is a structure which is designed to prevent rain or other particulate matter which is incident from a vertical direction from impinging directly on the port screen 426. It can be made from a metal, a plastic or other material suitable for exposure to outdoor elements for twenty years or more. Passive inlet stagnation port 430 is virtually identical in design except it is located in a position as indicated by port 404 or 406. Also, the airflow is in the opposite direction as indicated by the arrow 432.

Active stagnation port 440 differs from passive stagnation port 420 in that it incorporates a bimetallic valve 442 which is in contact with valve seat 444. A bimetallic valve is a valve which is well known to those skilled in the art of creating bimetallic structures. In this case the valve 442 is made in the form of a bimetallic strip that extends into the page and whose X and Y dimensions roughly correspond to those of the port screen 412. A bimetallic strip is a temperature sensitive structure made by layering two different metals with different thermal coefficients of expansion. As their temperature increase the overall shape of the strip changes as one layer expands faster than the other. In this design bimetallic valve 442 is designed and formed so that its normal shape is as shown during normal operational temperatures which would, for example, not exceed 200° C. In this situation the valve is closed and no airflow is possible from the interior of the collector to the environment or from the environment of the collector to its interior, in the case of the port being at the inlet. Outlet port 450 is shown in the state where the design temperature threshold has been exceeded. In this case the valve 452 has changed shape as a result and the is no longer in closed state. This allows for airflow through the collector.

The dimensions of inlet and outlet passive stagnation ports and valves may be different in order to maximize the flow rate and minimize the potential for incursion of particulates. There may also be more than one inlet or outlet port or valve mounted in the general areas as indicated by the collector 400, but in general the inlet and outlet ports or valves would be located at opposite ends of the collector with the outlet stagnation port located in a position that is elevated with respect to the inlet stagnation port. This is in-order to encourage convective flow driven by the fact that hot air rises. The ports or valves may be fabricated in shapes other than rectangular including but not limited to circular.

Figure 5:
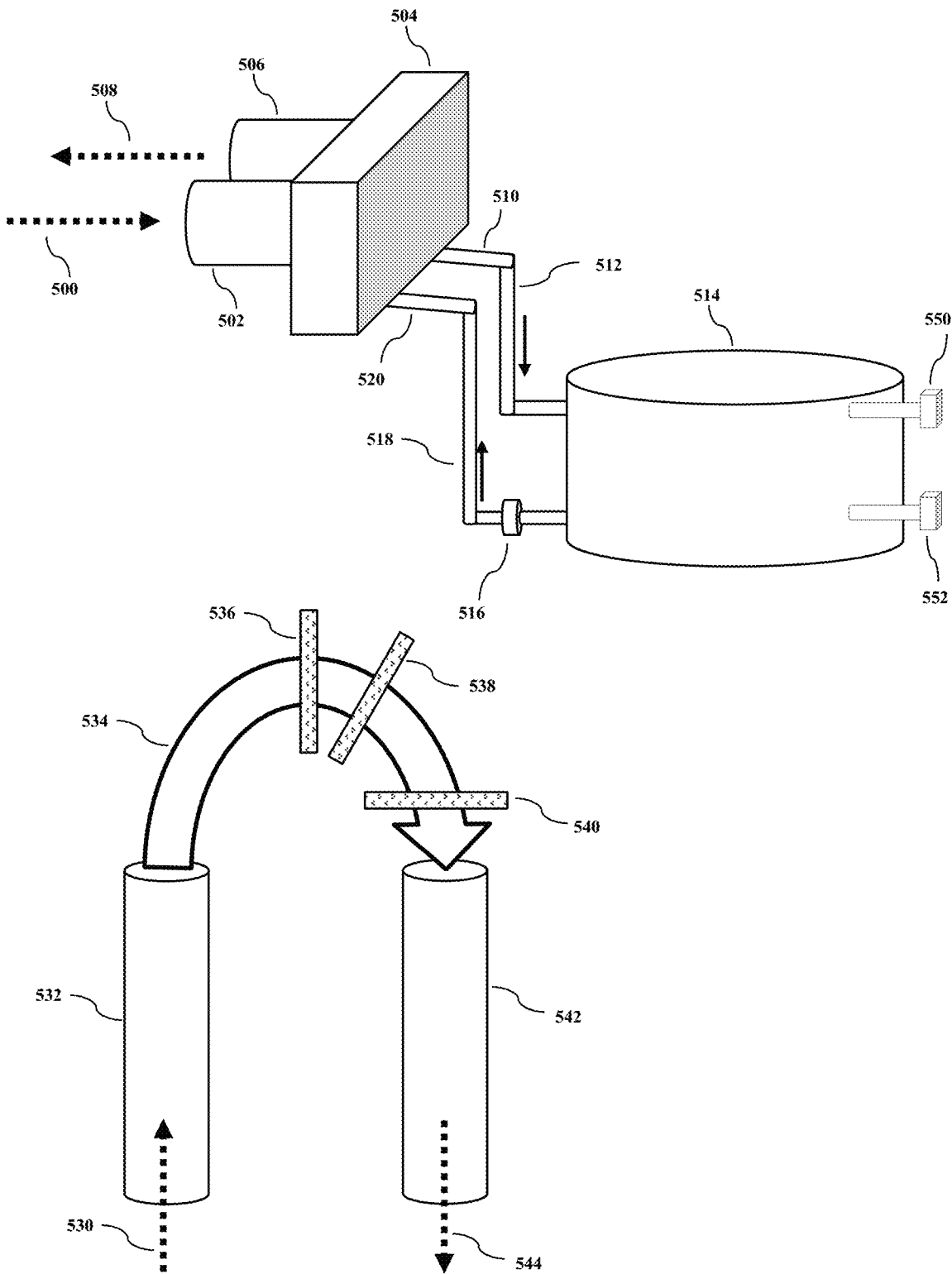
FIG. 5 is a drawing showing a means to insure water is purged from the heat exchanger liquid loop during time when the system is not in a powered state.

Referring now to FIG. 5, a generalized configuration for a heat exchanger and thermal storage tank is shown. In one preferred embodiment the liquid in the thermal storage tank is water. In another preferred embodiment the thermal storage tank is unpressurized, that is to say that the tank is not hermetically sealed and there is an air space above the liquid that is in fluid communication with ambient air. Inlet flow of heated air 500, and outlet flow of cooled air 508, are shown emerging from and flowing to an array of collectors, not shown, of a configuration schematically illustrated in FIG. 4. Heat exchanger 504 receives heated air 500 via inlet conduit 502. Heat is extracted from the incoming air by heat exchanger 504 and the resulting cooled flow is delivered to the collector array via outlet conduit 506.

Heat exchanger 504 receives cooled heat exchange fluid (HEF), e.g. water, from the bottom of thermal storage tank 514 via liquid pump 516, and inlet pipe 518, and pipe section 520. Heat from inlet air 500 is injected into the cooled liquid flow by heat exchanger 504 where is returned to the top of thermal storage tank 514 by pipe section 510, and outlet pipe 512. In general, the heat exchanger is located at a point which is elevated above the thermal storage tank. Heat exchanger 504 may also include the fan or fans that provide the primary motive force for the air circulating throughout the collector conduit array. In one embodiment, the inlet and outlet pipes 518 and 512 are constructed from a polymeric material including but not limited to cross linked polyethylene (PEX), polyvinyl chloride and cross-linked polyvinyl chloride, (PVC and CPVC) that have been suitably protected from exposure to UV radiation.

During normal operation and at the start of the day, all or most of the liquid in thermal storage tank is cooled to ambient temperature or the temperature of a municipal water supply to which it is thermodynamically coupled. When the collector array is illuminated the fan or fans (not shown) drive air flow through the heat exchanger and the pump 516 drives liquid flow through the heat exchanger from the bottom of the tank. Over the course of the day the liquid at the top of the tank 514 is heated, as hot liquid from the heat exchanger flows in, and the threshold between the hot liquid at the top of the tank and the colder liquid near the bottom, moves slowly downward as the colder liquid is extracted and circulated through the loop. When the day comes to a close or if for some other reason the pump becomes inactive it is important to insure that any liquid in the inlet and outlet pipes is removed from the piping system. This is so that any heat buildup does not create steam within the pipe and heat exchanger or any environmental temperature drop below freezing does not result in ice developing in the pipe or heat exchanger. Both circumstances could result in damage to the piping system and heat exchanger. Removal of water from the pipe system during pump non-operation can be achieved by insuring that any pipe sections 510 and 520, which are not vertical and connect the heat exchanger to the vertical inlet outlet pipes have a slope or fall, meaning they are tilted at an angle such that water naturally flows towards the thermal storage tank. In this way when the pump is inactive, the water naturally drains into the tank using the force of gravity. Pipe sections 510 and 520 may also comprise polymeric materials such as PEX, PVC or CPVC as long as the support system insures the natural flow is maintained. The design and orientation of the heat exchanger 504 must similarly take advantage of this auto purging feature. In this case any piping or piping loops located on the interior of the heat must have an overall orientation and internal diameter such that when the pump is in a non-operational state the water inside the heat exchanger 504 flows to the sloped pipe sections 510 and 520, where it is then carried to the thermal storage tank. This natural drain from the interior of the heat exchanger may also be encouraged by proper elevation of the heat exchanger with respect to inlet and outlet pipes 518 and 512.

Referring yet again to FIG. 5, inlet chimney 532 is shown with hot air flow 530 entering it from below. Hot air flow 530 comes from the extractor loop of a solar thermal heat transfer system which is not shown. Chimney 532 is a sealed and insulated conduit constructed of materials described earlier in this specification and is oriented vertically so that it may perform a function much like that of a chimney. Curved conduit 534 is indicated symbolically like as an arrow to indicate the direction of flow through representative heat exchangers 536, 538, and 540. Conduit 534 is hermetically coupled to inlet conduit 532, and outlet conduit 542. Heat exchangers 536, 538, and 540 are the same heat exchanger but shown in three representative positions and orientations. They function just like heat exchanger 504 in that they are designed to extract heat from hot air flows and transfer it to a liquid loop. Hot inlet air 530 will have a tendency to rise towards heat exchanger 536 where it will be subsequently cooled. The cooled air, because its density is now higher, will have a tendency to descend and therefore support the buoyancy driven flow of hot inlet air 530. In order for this effect to work with the greatest efficiency the orientation of the heat exchanger 536 must be such that air that is cooled by it is encouraged to flow downwards towards the outlet conduit 542. In this regard the orientation of heat exchanger 536 may work well but moving it to the orientation and position 538 should work better, and towards orientation and position 540 should work better still. As the orientations and positions progress from 536 to 540 it is harder any cooled air that emerged from to flow backwards towards inlet conduit 532 as this would require that it rise instead of descending. Thus, the optimal orientation of the heat exchanger is such that the area of the heat exchanger from which the cooled air emerges must be somewhere between horizontal and vertical and downward facing. Cooled air 544 is either dispensed to the ambient or re-circulated depending on whether the overall system is once through or closed loop as described earlier.

Figure 6:
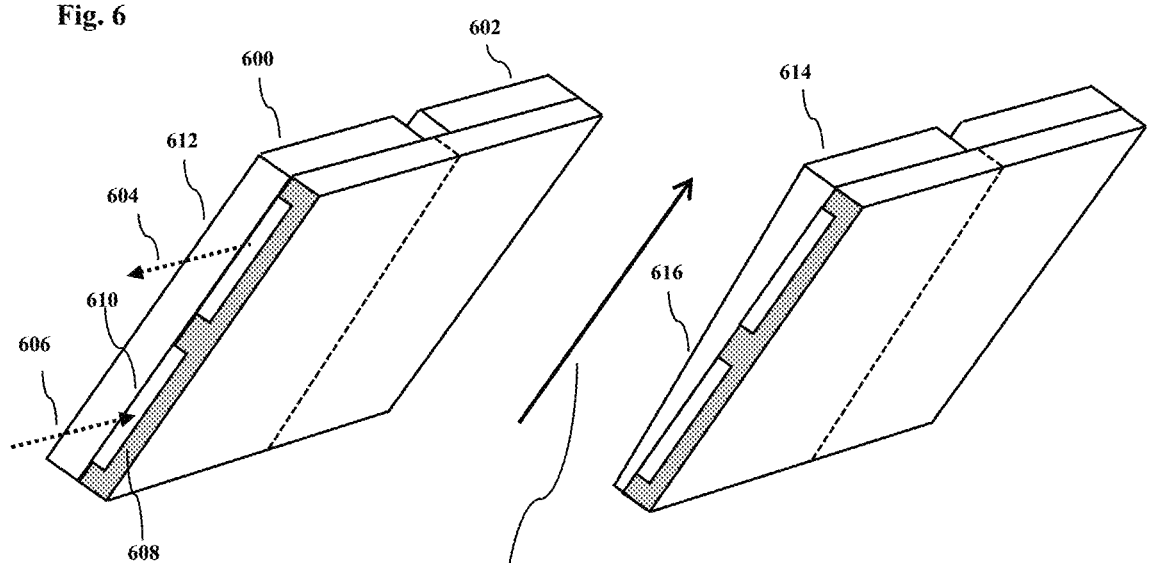
FIG. 6 is a drawing showing a conduit configuration wherein the conduits utilized the body of the collector to provide an insulating wall.
Figure 6:
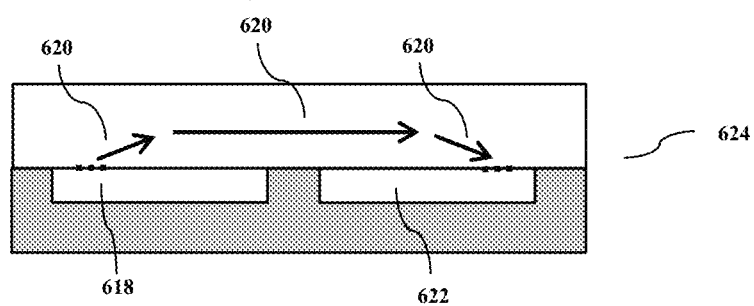
Figure 6:
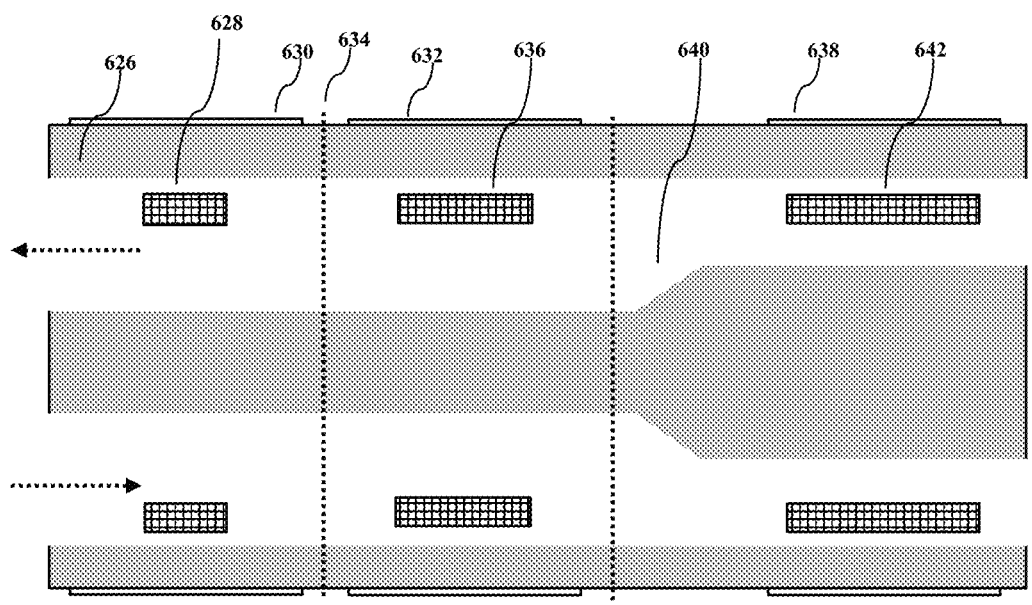

Referring now to FIG. 6, a drawing is shown of yet another conduit configuration involving two representative collectors 600 and 602 which are mounted side by side. In this case the inlet and outlet conduits are combined in a single insulated monolithic conduit 608 with inlet and outlet airflows indicated by arrows 606 and 604 respectively. Monolithic conduit differs from the conduits illustrated in FIG. 3 by the fact that it is formed from a single piece of material, for example polyurethane foam, and by the fact that one of the walls of conduit is formed by the rear wall of the collector 610. This configuration has the advantage of reducing the amount of material required to construct the conduit since the body of the collector itself can play the role of the missing insulating wall. It also dispenses with the need for, referring again to FIG. 3, the male/female inlet and outlet ports described in that figure. An aperture of some sort is still required to allow for fluid communication between the interior of the collector and the conduit, and this cut into the rear wall of the collector.

Referring again to FIG. 6, collector 600 is shown with glazing 612 which is the transparent film or planar structure that transmits light into the interior of the collector. It is shown in this case to be parallel to the rear wall 610 of the collector. Collector 614 is shown with a glazing that is mounted at an angle to the rear wall. This feature is advantageous because it allows for a reduction in the amount of material used to construct the body of the collector. This can be accomplished without much increase in heat loss because the colder air entering the bottom of the collector losses less heat to the atmosphere.

Referring again to FIG. 6, collector 614 is shown in cross-section as collector 624, and is coupled to a monolithic conduit integrating inlet conduit 618 and outlet conduit 622. Arrow 620 illustrates the direction of airflow within the body of collector 614, which is by turns perpendicular away from the rear wall, parallel to the rear wall, and perpendicular towards the rear wall as it moves from the inlet conduit 618 to the outlet conduit 622.

Referring yet again to FIG. 6, a rear view drawing of the interior layout of a section of the monolithic conduit 626 is shown connecting collectors 630, 632, and 638 which are coupled to the conduit via apertures 628, 636, and 642. A cross-section reduction flange 640 is shown and it performs the same function as the flange drawn in FIG. 3. In addition to potentially incorporating different restrictions on flow via different porosities or diameters, the apertures 628, 636, and 642 show different geometries as yet another mechanism to control the flow rate into and out of the collectors.

Figure 7:
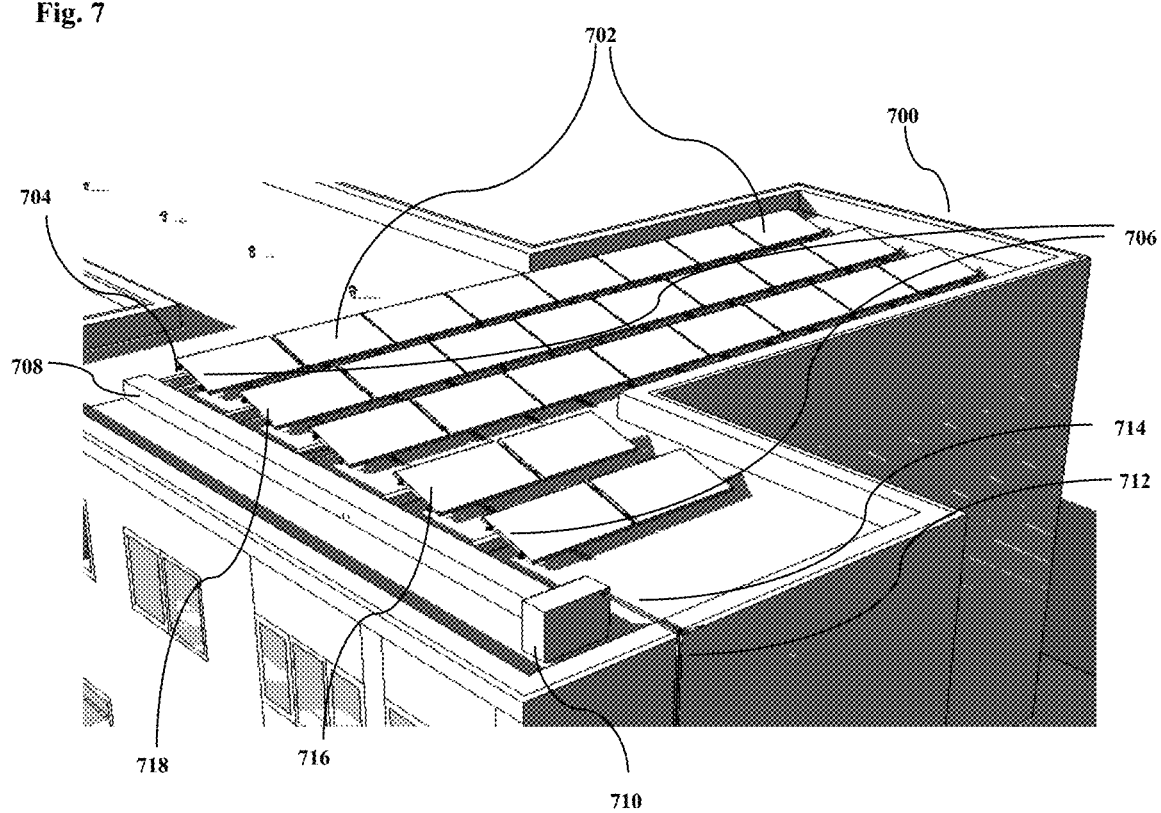
FIG. 7 is a rendering which illustrates a rooftop mounted solar thermal collector array.

Referring now to FIG. 7, a rendering is shown of a solar thermal collector system mounted on building rooftop 700 with five segment loops. Collector segment loop 702, coupled to conduit pair 704, comprises multiple collectors which deliver heat in the form of hot air to the conduit pair 704 in fashion described earlier in this specification. Heat from multiple segment loops 706, is combined in extraction loop 708 where it is delivered to heat exchanger 710. Heat exchanger 710 is coupled via pipe loop 712 to a thermal storage tank, not shown, located in the basement of the building. Pipe sections 714 are tilted as discussed in FIG. 5, in a manner that insures that any liquid that drains from the heat exchanger 710 during pump non-operation will drain into the pipe loop 712 and ultimately into the thermal storage tank. The tilt, described as a fall, must be at least as 15-30 mm per meter.

Pressure varies along the length of extractor loop 708 in the same was as it varies along the length of segment loop 702. Thus, measures must be taken to control the flow to different segments in order to try to achieve a uniform or otherwise defined performance throughout the entire array if that is the goal. Similar techniques as described in FIG. 3 can also be applied. Thus, the overall dimensions of the extractor loop 708 may change along the length of the loop, though this is not illustrated. There may also be flow restrictors placed at the junctures between the extractor loop and the segment loop, (hidden from view). The characteristics of the flow restrictors would be set according to the pressure required at each segment as well as the pressure available at the point where the segment loop is connected to the extractor loop. One, the other, or both of these solutions may be applied to support the development of uniform flow. Another option is to place a pressure regulating fan at the junctions between the extractor loop and the segment loop. These fans could provide additional pressure to the inlet leg of one or more segment loops by individually controlling the speed of the fan. Referring again to FIG. 7, the number of collectors connected to segment loop 718 is larger than the number connected to segment loop 716. As a consequence, the volume of air required for the collectors on segment loop 718 will be larger. Thus, in order to maintain uniform performance of the collectors the characteristics of the flow control mechanisms, whether that be a flow restrictor, a fan, the dimensions of the extractor loop conduit, or some combination of all of them, must be set or controlled in order to achieve that goal. If some specified non-uniform performance is required, then the flow control mechanisms must also be set accordingly.

In the case where pressure regulating fans are utilized to modify the characteristics of the system then the fans would be modulated by virtue of a central control unit which would be coupled to appropriately positioned pressure sensors and driven by the requisite control algorithms.

The invention claimed is:

1. A solar thermal system, comprising:
   at least one solar thermal collector for heating a heat transfer fluid (HTF); and
   at least one conduit for transporting the HTF into and out of the at least one solar thermal collector, said at least one conduit defining a closed section;
   wherein said HTF transfers heat to exterior of said at least one solar thermal collector for consumption by an energy user; and
   wherein said at least one conduit is monolithically formed from a single, homogeneous material, specifically a polymeric foam, to ensure uniform thermal properties and structural integrity throughout.

2. The system of claim 1, comprising multiple solar thermal collectors arranged in series, and a mechanism for regulating a pressure at which the HTF is fed into each of the multiple solar thermal collectors, wherein geometry and physical state of the mechanism is fixed.

3. The system of claim 2, wherein said mechanism comprises a flow-restricting structure.

4. The system of claim 3, wherein said flow-restricting structure comprises a flow control mechanism to control intake of HTF via an inlet associated with each collector.

5. The system of claim 3, wherein said flow-restricting structure is defined by a reduction in cross-sectional area of a conduit which is fixed, and whose geometry is determined by the location of the structure in a string of collectors including the multiple solar thermal collectors arranged in series.

6. The system of claim 1, further comprising a network of conduits configured to connect in series at least one segment loop each comprising a set of N solar thermal collectors.

7. The system of claim 1, wherein each conduit is selected from the group consisting of a circular, rectangular, and a triangular shape.

8. The system of claim 1, further comprising a mechanism for preventing thermal stagnation in the at least one solar thermal collector to drive air flow through the collector during a stagnation event.

9. The system of claim 8, wherein said mechanism comprises at least one inlet and outlet fabricated in a body of the solar thermal collector to support ventilation.

10. The system of claim 8, wherein said mechanism further comprises an active valve.

11. The system of claim 1, configured to allow gravity to cause a heat exchange fluid (HEF) in at least one connecting pipe to drain out from an at least one heat exchanger within a segment loop or an extraction loop in the event that active pumping devices are rendered inoperative.

12. The system of claim 1, comprising a plurality segment loop each comprising a set of N solar thermal collectors; wherein the plurality of segment loops is configured to exhaust HTF via a single extraction loop.

13. The system of claim 1, wherein a conduit is configured to utilize a body of a solar thermal collector as in an insulating surface.

* * * * *